United States Patent
Xu et al.

(10) Patent No.: US 9,911,326 B2
(45) Date of Patent: Mar. 6, 2018

(54) METHOD AND APPARATUS FOR DETECTING PEDESTRIAN MODE FROM PROBE DATA

(71) Applicant: HERE Global B.V., Veldhoven (NL)

(72) Inventors: Bo Xu, Lisle, IL (US); Jane MacFarlane, Oakland, CA (US)

(73) Assignee: HERE Global B.V., Veldhoven (NL)

( * ) Notice: Subject to any disclaimer, the term of this patent is extended or adjusted under 35 U.S.C. 154(b) by 80 days.

(21) Appl. No.: 14/674,839

(22) Filed: Mar. 31, 2015

(65) Prior Publication Data

US 2016/0293001 A1 Oct. 6, 2016

(51) Int. Cl.

| | |
|---|---|
| *G06F 19/00* | (2011.01) |
| *G08G 1/01* | (2006.01) |
| *H04W 4/04* | (2009.01) |
| *G08G 1/052* | (2006.01) |
| *G08G 1/056* | (2006.01) |

(52) U.S. Cl.
CPC ......... *G08G 1/0133* (2013.01); *G08G 1/0112* (2013.01); *H04W 4/046* (2013.01); *G08G 1/052* (2013.01); *G08G 1/056* (2013.01)

(58) Field of Classification Search
CPC .... G08G 1/0133; G08G 1/0112; G08G 1/052; G08G 1/056; H04W 4/046
USPC ............................ 701/117, 118, 36, 410, 512
See application file for complete search history.

(56) References Cited

U.S. PATENT DOCUMENTS

| | | | | |
|---|---|---|---|---|
| 6,317,683 | B1 * | 11/2001 | Ciprian | G01C 21/30 701/118 |
| 6,405,132 | B1 * | 6/2002 | Breed | B60N 2/002 701/117 |
| 8,812,260 | B2 * | 8/2014 | Yuen | G06K 9/22 702/160 |
| 9,241,635 | B2 * | 1/2016 | Yuen | A61B 5/02405 |

(Continued)

OTHER PUBLICATIONS

Liao et al., "Learning and Inferring Transportation Routines", Proceedings of the National Conference on Artificial Intelligence, 2004, 6 Pages.

(Continued)

*Primary Examiner* — Ronnie Mancho
(74) *Attorney, Agent, or Firm* — Ditthavong & Steiner, P.C.

(57) ABSTRACT

An approach is provided for processing and/or facilitating a processing of probe trace data to determine one or more mode indicators, wherein the one or more mode indicators include, at least in part, one or more attributes of the probe trace data. The approach involves causing, at least in part, a modeling of one or more statistical patterns of at least one pedestrian mode of transport, at least one non-pedestrian mode of transport, or a combination thereof based, at least in part, on determining one or more probabilities that one or more mode indicators are associated with the at least one pedestrian mode of transport, the at least one non-pedestrian mode of transport, or a combination thereof. The approach also involves causing, at least in part, a classification of other probe trace data as being associated with the at least one pedestrian mode of transport or the at least one non-pedestrian mode of transport based, at least in part, on the one or more mode indicators that are associated with the other probe trace data and the one or more statistical patterns.

17 Claims, 12 Drawing Sheets

(56) References Cited

U.S. PATENT DOCUMENTS

| | | | |
|---|---|---|---|
| 9,448,072 B2* | 9/2016 | Bandyopadhyay | G01C 21/165 |
| 2003/0191568 A1* | 10/2003 | Breed | B60W 40/06 |
| | | | 701/36 |
| 2011/0161076 A1* | 6/2011 | Davis | G06F 3/04842 |
| | | | 704/231 |
| 2011/0161119 A1* | 6/2011 | Collins | G06Q 40/08 |
| | | | 705/4 |
| 2012/0136573 A1* | 5/2012 | Janardhanan | G01C 21/165 |
| | | | 701/512 |
| 2013/0090881 A1* | 4/2013 | Janardhanan | G01C 22/006 |
| | | | 702/104 |
| 2013/0173149 A1* | 7/2013 | Lu | G01C 21/32 |
| | | | 701/410 |
| 2014/0141796 A1* | 5/2014 | Marti | G01S 5/0252 |
| | | | 455/456.1 |
| 2014/0180914 A1* | 6/2014 | Abhyanker | G01C 1/00 |
| | | | 705/39 |
| 2014/0316305 A1* | 10/2014 | Venkatraman | A61B 5/1112 |
| | | | 600/595 |

OTHER PUBLICATIONS

Reddy et al., "Using Mobile Phones to Determine Transportation Modes", Journal ACM Transactions on Sensor Networks (TOSN), Feb. 2010, vol. 6, No. 2, 27 Pages.

Stenneth et al., "Transportation Mode Detection using Mobile Phones and GIS Information", Proceedings of the 19th ACM SIGSPATIAL International Conference on Advances in Geographic Information Systems, 2011, retrieved on Jul. 8, 2015 from http://www.cs.uic.edu/~boxu/mp2p/p54-stenneth.pdf, 10 Pages.

Zheng et al., "Understanding Mobility Based on GPS Data", International Conference on Ubiquitous Computing, 2008, retrieved on Jul. 8, 2015 from http://research.microsoft.com/pubs/77984/Ubicomp270-yuzheng.pdf, 10 Pages.

Zheng et al., "Learning Transportation Mode from Raw GPS Data for Geographic Applications on the Web", Proceeding of the 17th International Conference on World Wide Web, Apr. 2008, retreived on Jul. 8, 2015 from http://www2008.org/papers/pdf/p247-zhengA.pdf, 10 Pages.

* cited by examiner

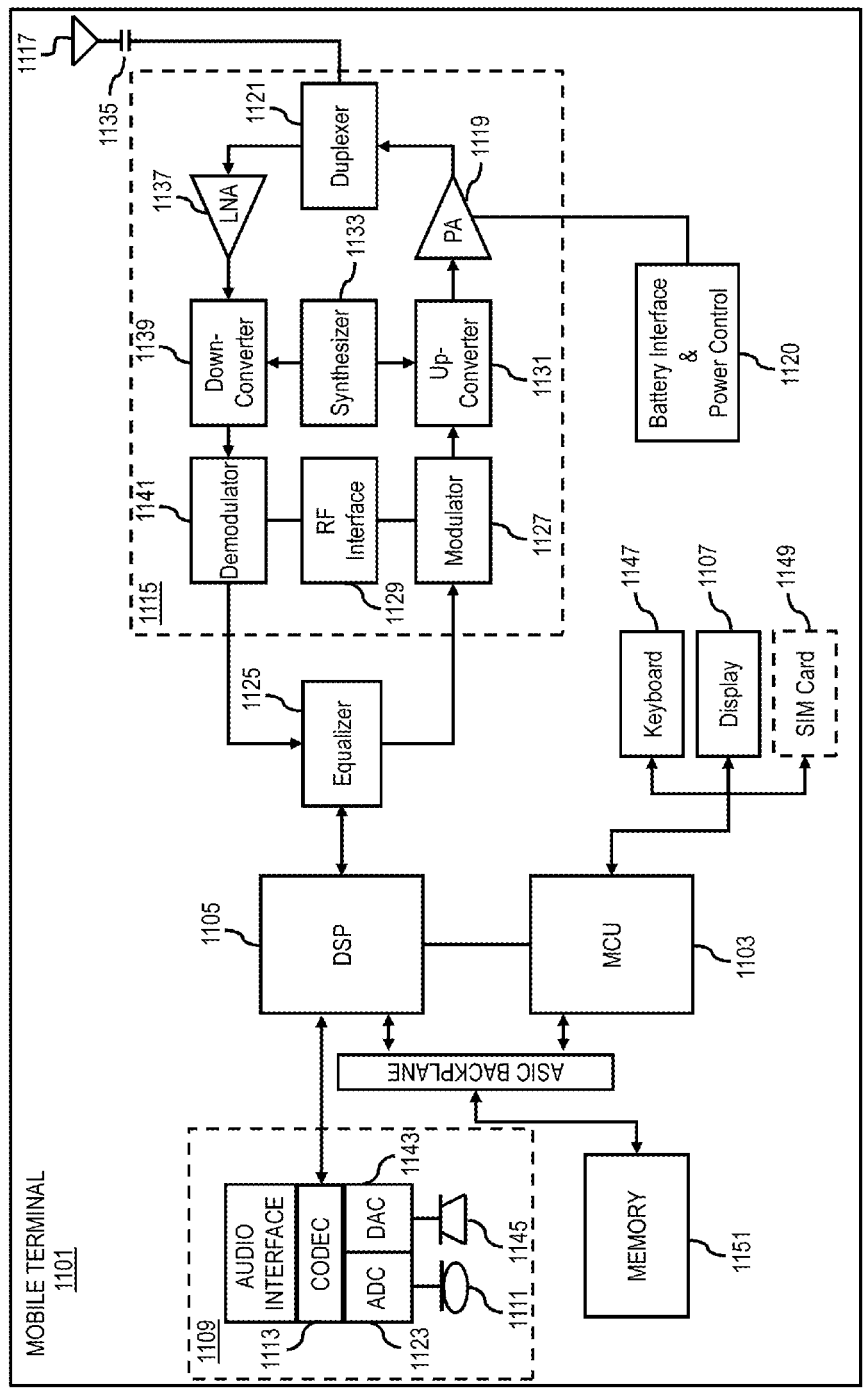

METHOD AND APPARATUS FOR DETECTING PEDESTRIAN MODE FROM PROBE DATA

BACKGROUND

Service providers and device manufacturers (e.g., wireless, cellular, etc.) are continually challenged to deliver value and convenience to consumers by, for example, providing compelling network services. One area of interest has been the development of transportation mode detection for determining pedestrian and vehicle (car, bike, motorcycle, etc.) designated areas. However, when detecting probe (pedestrian, vehicle, etc.) information, there is often enough ambiguity in the data to preclude classification as pedestrian or vehicle, respectively. This problem may be particularly acute in areas where both modes are used and/or both modes have similar characteristics (speed, direction, path, etc.). Accordingly, service providers and developers face significant technical challenges to enable higher certainty mode classification for travel locations.

SOME EXAMPLE EMBODIMENTS

Therefore, there is a need for an approach for a processing of probe data (e.g., probes from pedestrians and vehicles) to determine one or more modes of transport associated with statistical patterns from the probe data.

According to one embodiment, a method comprises processing and/or facilitating a processing of probe trace data to determine one or more mode indicators, wherein the one or more mode indicators include, at least in part, one or more attributes of the probe trace data. The method also comprises causing, at least in part, a modeling of one or more statistical patterns of at least one pedestrian mode of transport, at least one non-pedestrian mode of transport, or a combination thereof based, at least in part, on determining one or more probabilities that one or more mode indicators are associated with the at least one pedestrian mode of transport, the at least one non-pedestrian mode of transport, or a combination thereof. The method further comprises causing, at least in part, a classification of other probe trace data as being associated with the at least one pedestrian mode of transport or the at least one non-pedestrian mode of transport based, at least in part, on the one or more mode indicators that are associated with the other probe trace data and the one or more statistical patterns.

According to another embodiment, an apparatus comprises at least one processor, and at least one memory including computer program code, the at least one memory and the computer program code configured to, with the at least one processor, cause, at least in part, the apparatus to process and/or facilitate a processing of probe trace data to determine one or more mode indicators, wherein the one or more mode indicators include, at least in part, one or more attributes of the probe trace data. The apparatus is also caused to cause, at least in part, a modeling of one or more statistical patterns of at least one pedestrian mode of transport, at least one non-pedestrian mode of transport, or a combination thereof based, at least in part, on determining one or more probabilities that one or more mode indicators are associated with the at least one pedestrian mode of transport, the at least one non-pedestrian mode of transport, or a combination thereof. The apparatus is further caused to cause, at least in part, a classification of other probe trace data as being associated with the at least one pedestrian mode of transport or the at least one non-pedestrian mode of transport based, at least in part, on the one or more mode indicators that are associated with the other probe trace data and the one or more statistical patterns.

According to another embodiment, a computer-readable storage medium carries one or more sequences of one or more instructions which, when executed by one or more processors, cause, at least in part, an apparatus to process and/or facilitate a processing of probe trace data to determine one or more mode indicators, wherein the one or more mode indicators include, at least in part, one or more attributes of the probe trace data. The apparatus is also caused to cause, at least in part, a modeling of one or more statistical patterns of at least one pedestrian mode of transport, at least one non-pedestrian mode of transport, or a combination thereof based, at least in part, on determining one or more probabilities that one or more mode indicators are associated with the at least one pedestrian mode of transport, the at least one non-pedestrian mode of transport, or a combination thereof. The apparatus is further caused to cause, at least in part, a classification of other probe trace data as being associated with the at least one pedestrian mode of transport or the at least one non-pedestrian mode of transport based, at least in part, on the one or more mode indicators that are associated with the other probe trace data and the one or more statistical patterns.

According to another embodiment, an apparatus comprises means for processing and/or facilitating a processing of probe trace data to determine one or more mode indicators, wherein the one or more mode indicators include, at least in part, one or more attributes of the probe trace data. The apparatus also comprises means for causing, at least in part, a modeling of one or more statistical patterns of at least one pedestrian mode of transport, at least one non-pedestrian mode of transport, or a combination thereof based, at least in part, on determining one or more probabilities that one or more mode indicators are associated with the at least one pedestrian mode of transport, the at least one non-pedestrian mode of transport, or a combination thereof. The apparatus further comprises means for causing, at least in part, a classification of other probe trace data as being associated with the at least one pedestrian mode of transport or the at least one non-pedestrian mode of transport based, at least in part, on the one or more mode indicators that are associated with the other probe trace data and the one or more statistical patterns.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 11 is a diagram of a mobile terminal (e.g., handset) that can be used to implement an embodiment of the invention.

DESCRIPTION OF SOME EMBODIMENTS

Examples of a method, apparatus, and computer program for a processing of probe trace data to determine one or more modes of transport and causing a classification of the modes based on mode indicators are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to determining probe trace data to determine one or more mode indicators including attributes of the probe trace data, it is contemplated that the probe trace data with attributes may include a number of parameters associated with pedestrian or vehicle transportation. The probe trace data may include information related to location, speed, direction, and time. Also, it may include information related to heading change rate, acceleration, jerk, elevation, distance from public transport landmarks, frequency of stops, closeness to road links, and other like information. Furthermore, the mode indicators and/or attributes may include any relevant statistical analysis and/or pattern description.

In addition, although various embodiments are described with respect to a modeling of statistical patterns of a pedestrian mode of transport or a non-pedestrian mode of transport, it is contemplated that the embodiments are also applicable to other types of patterns and/or parameters that may be applicable to determining a mode of transport. Such may include user or vehicle identification, street information, and/or location information, such as one way streets, non-walking areas, street closures, and other like information. Furthermore, these patterns may be included into the modeling as a means or updating the system and/or to construct a machine learning protocol.

Figure 1:
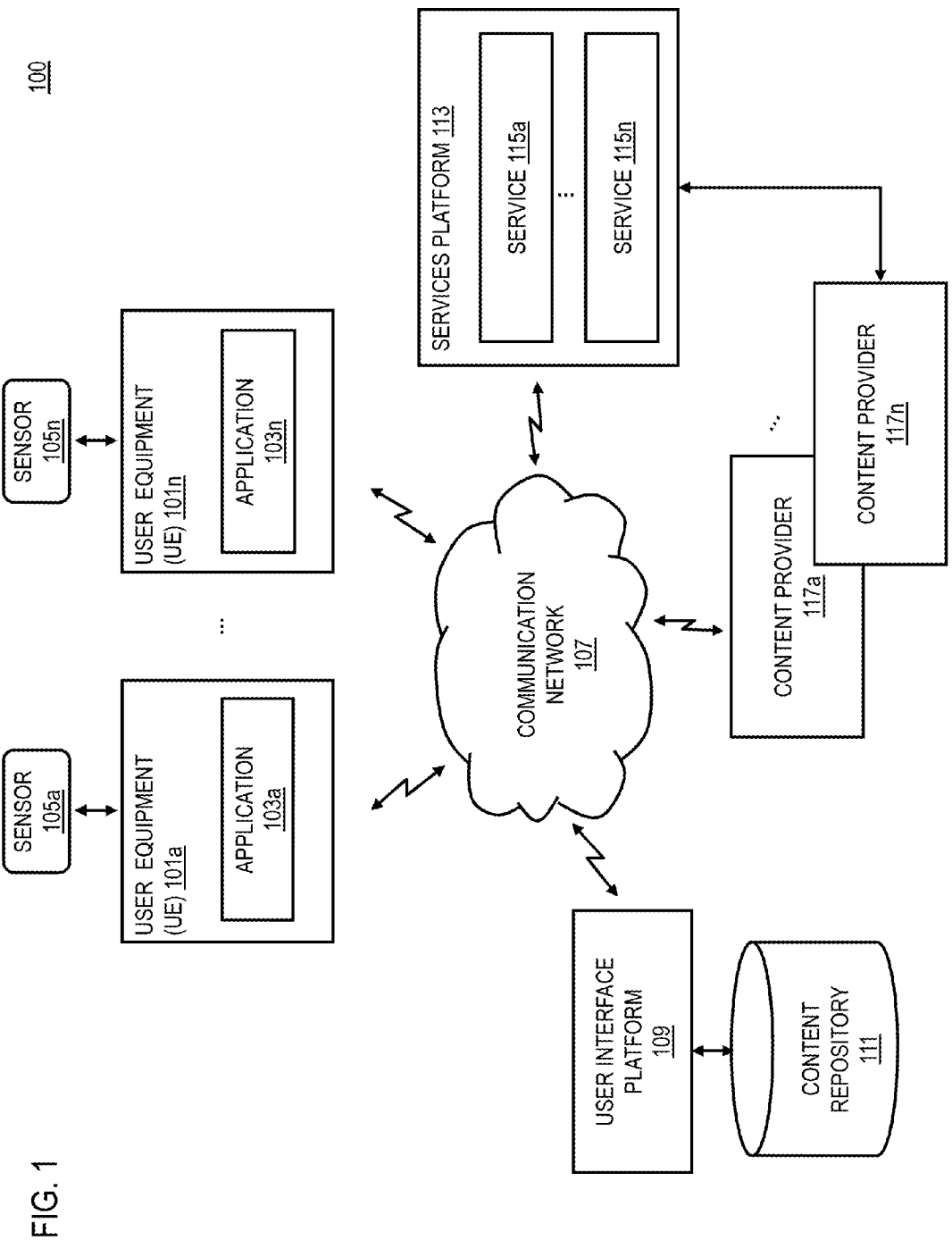
FIG. 1 is a diagram of a system capable of a processing of probe trace data to determine one or more modes of transport, according to one embodiment.

FIG. 1 is a diagram of a system capable of a processing of probe trace data to determine one or more modes of transport, according to one embodiment. As noted above, the determination of pedestrian and non-pedestrian areas of transportation for mapping information may be difficult to determine for some probe traces considering only limited probe trace data sets. One common use of probe trace data is in the context of map application and services. For example, many map applications and services support applications for walking and driving paths for pedestrian and non-pedestrian modes, respectively (e.g., streets, highways, biking/walking paths, sidewalks, etc.) to enable a user to choose a means of transport or to accommodate the user's preferred transportation mode. In this way, user modes of transport may be explored prior to actual transport or the mapping information could be used for real-time information and/or updates.

However, these map applications for pedestrian and non-pedestrian modes of transport have generally lacked reliable statistical pattern recognition to determine modes of transport for one or more probes at particular times and for overlapping data sets of pedestrian and non-pedestrian data, respectively. In other words, the mapping applications use viable route information without regard to the quantity and distribution of the modes of transport for particular places and times. Furthermore, the classifications are often rigid without a machine learning protocol to continually update travel mode recognition and information.

To address this problem, a system 100 of FIG. 1 introduces a new method of processing probe trace data to determine the mode of transport for one or more probe traces for one or more pedestrian and non-pedestrian modes of transport, respectively. In one embodiment, the system 100 processes probe trace data, such as may be obtained from a user device including a smartphone, Wi-Fi, RFID, and other like devices for an analysis of statistical patterns. The system applications can model an aggregate of the probe data to transcend the limitations of extracting location, speed, or other such parameters alone or in limited combinations. Such aggregation may include location, speed, direction, heading (direction) change rate, and other like parameters as mode indicators to determine patterns characteristic of a particular mode, such as may be the case for a pedestrian or non-pedestrian (passenger vehicle, cyclist, train, etc.) using algorithms and/or network information. Such selection may be based on one or more probabilities that the attributes of the probe trace data reflect one or another modes. This enables the system 100 to make a determination in cases where definitive information is unavailable.

In another embodiment, the system 100 can model statistical patterns for a pedestrian mode of transport based on known pedestrian probe trace data. For a dataset of pedestrian data, a comparison may be made between the gathered pedestrian data and known pedestrian probe trace datasets. By this comparison, an analysis may be made as to quantify and qualify characteristics of pedestrian behavior within the obtained pedestrian probe trace datasets. The attributes be any known or derived characteristic of pedestrian transport including location, path characteristics, speed, start and stop behavior, and other like attributes. Likewise, a dataset of non-pedestrian data may be obtained and compared with non-pedestrian datasets including those of passenger vehicles, bicycles, public transportation, and other like non-pedestrian modes of transport. The like attributes may be characterized and catalogued to distinguish these modes from one another and further from the pedestrian mode data. Also, an unknown proportion of the obtained data may be ambiguous or of an uncertainty significant enough to warrant withholding a classification until more and/or better comparisons can be made with known classifiable datasets. Thus, each obtainable probe trace dataset—pedestrian, non-pedestrian, ambiguous—may be classified based on a categorization of the probe trace data using one or more characteristics or attributes including a speed of travel, location in the spatial domain, smartphone reporting activity, path characteristics, or a combination thereof. This may be done in one or more iterations to achieve a greater confidence and/or accuracy. For example, the ambiguous data may be classifiable as pedestrian or non-pedestrian through multiple iterations of data matching and statistical pattern analysis and therefore reduce uncertainty in the datasets. Furthermore, the system 100 may be designed for machine learning and include a greater accuracy of probe trace identification over time.

In another embodiment, the system 100 may use a number of simple parameters and guidelines to categorize the probe trace data—as pedestrian or non-pedestrian modes—before using more intensive analytical techniques. For example, the clear pedestrian probe data may be classified as such by determining if the probe trace data in question originated from one or more pedestrian zones; the probe trace proceeds in the wrong direction on a one-way street; and/or originates from a street that is closed to non-pedestrian traffic. Thus, using a simple analysis of this sort, a proportion of the data can be neatly classified. Likewise, non-pedestrian data may be classified by other simple criteria. For example, the clear non-pedestrian probe data may be classified as such by determining if the probe trace data in question includes probe traces traveling at non-pedestrian speed, originates from a fleet of multiple probe traces traveling in a way characteristic of non-probe data, or the probe trace data originates from a street with no pedestrian paths or is otherwise inaccessible to pedestrians. Thus, these means of analysis may be used alone or in combination with other means to determine one or more modes of travel. Furthermore, other simply criteria may be used iteratively on new or previously classified probe trace datasets. For a dataset of pedestrian data, for example, a comparison may be made between the gathered pedestrian data and known pedestrian probe trace datasets. By this comparison, an analysis may be made as to quantify and qualify characteristics of pedestrian behavior within the obtained pedestrian probe trace datasets.

In an example use case, a sequence of probe traces are catalogued and classified using clearly identifiable attributes as pedestrian and/or non-pedestrian. Subsequently, this probe trace data report is merged and integrated with other information about the probe trace surroundings including street data, transportation network data, real-time data—all of which together may be considered ground truth factors. The data (ground truth factors) that are identifiably pedestrian or non-pedestrian may be used to create a classification set that may be used to classify other like probe trace data and further used to train a classification model based on modeling statistical patterns characteristic of the data sets. For example, the probe trace reports may be gathered every t seconds, where t is a system parameter. These incoming reports are labeled with a pseudo id with the name of its supplying vendor. The trace consists of a sequence $(x_1,y_1,v_1,h_1,t_1), (x_2,y_2,v_2,h_2,t_2), \ldots (x_n,y_n,v_n,h_n,t_n)$ $(t_1<t_2<\ldots<t_n)$, indicating that a person is at location $(x_i,y_i)$ with speed $v_i$ and heading $h_i$ at time $t_i$. For privacy concerns, each trace only records a short period of a trip and therefore is usually traveled with a single transportation mode. From this data, a number of attributes may be used to define a pedestrian, such as speed of travel, location in the spatial domain, smartphone reporting activity, overall path characteristics (origin-destination, location, heading change rate, speed change rate, frequency of stops, closeness to road links), etc. Also, based on the level of ambiguity in classification, there are three categories of traces (see FIG. 6). The first category is traces that can be clearly classified as in walk mode. These include traces in pedestrian zones/streets, traces that are going on a one-way street the wrong way, traces that are generated during the time streets are closed for vehicle traffic, etc. The second type is traces that can be clearly classified as in non-walk mode. These include traces that are moving at speeds significantly higher than walking speeds; traces that are generated by fleets; and traces on roads where there are no sidewalks such as highways, etc. The third type is traces for which there can be ambiguity in classification. For example, a trace moving at 4 mph may be a brisk walk or a slowly moving vehicle in a traffic jam. Thus classified, the model based on these modes may be formed and refined as more data is accumulated and analyzed.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the user interface platform 109 via the communication network 107. In one embodiment, the user interface platform 109 performs the functions associated with a processing of probe trace data to determine one or more modes of transport.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as content provisioning services, location-based service applications, navigation applications, camera/imaging application, media player applications, social networking applications, calendar applications, and the like. In one embodiment, one of the applications 103 at the UE 101 may act as a client for the user interface platform 109 and perform one or more functions of the user interface platform 109. In one scenario, users are able select the particular mode of transport for identification via one or more map applications. In one embodiment, one or more receivers of the UE 101 may aggregate and include updated information using probe trace data reports or real-time information to provide improved mapping information related to the transportation modes.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, Wi-Fi, etc.). In one scenario, the one or more sensors 105 may detect attributes for one or more modes of transportation. In another scenario, the one or more UE 101 may have sensors tuned to detect characteristic aggregates of one or more modes of transport, whereby the sensor data may be calculated either on the cloud or by the UE 101

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

As described above, in one embodiment, the system 100 may process probe trace data to determine one or more mode indicators. In one scenario, the probe trace data is gathered by conventional means such as by mobile device, GPS data, and like means and processed to include one or more probe traces, which follows the travel path of a mode of transport—pedestrian or non-pedestrian. In one scenario, the data are then analyzed by assessing the probe trace(s) over a specified time period. In one embodiment, the one or more mode indicators include, at least in part, one or more attributes of the probe trace data. In one scenario, various characteristics or attributes can be gleaned from the one or more statistical patterns, such as a speed of travel, location in the spatial domain, smartphone reporting activity, overall path characteristics (origin-destination, location, heading change rate, speed change rate, frequency of stops, closeness to road links), etc. From such attributes, processed by appropriate algorithms, the system can perform a determination leading to a classification (pedestrian, non-pedestrian, walking, running, biking, passenger vehicle, train, etc.).

In one embodiment, the system 100 may include a modeling of one or more statistical patterns of a pedestrian mode of transport, non-pedestrian mode of transport, or a combination thereof. In one scenario, the system 100 may include a process of modeling, using algorithms and other like means, to recognize characteristic patterns of one or more modes of transport. Once the system 100 has performed an initial classification by analyzing the relevant attribute, a further analysis may be made based on these statistical patterns, which can be applied to current and future data by linking the acquired attributes to the relevant modes of transport. In one embodiment, the system 100 may determine a probability that one or more mode indicators are associated with a pedestrian mode of transport, a non-pedestrian mode of transport, or a combination thereof. In one scenario, the attributes, alone or in combination, are correlated with a mode of transport. Such attributes may include speed information, speed change rate information, heading information, heading change rate information, stop rate information, information regarding closeness to one or more road links, and/or other like parameters. The correlation between such attributes and a mode of transport may be given a probability, a variance, or other statistical parameter to determine the relative certainty of one or more probe data traces. The probabilities may be adjusted based on the user's need and/or feedback information as to the reliability of each data set. In one embodiment, the mode indicators are associated with other probe trace data and the one or more statistical patterns. In this scenario, probe trace data may not fit classification as definitively pedestrian or non-pedestrian. In other words, the attributes are ambiguous and not clearly associate with one or more modes of transport. However, through an iterative process of correlating and understand the relationship between different attributes and modes of transport, some or all of this ambiguous data may be classified under a pedestrian or non-pedestrian mode of transport.

In one embodiment, the system 100 may cause the modeling of statistical patterns for each of a pedestrian mode or a non-pedestrian mode based on probe trace data that clearly fits into one of these categories. In one scenario, patterns of speed information, velocity, acceleration, deceleration, heading information, heading change rate information, and other like parameters can be catalogued and used to design a model using an algorithm to determine whether the given attributes correspond with relatively high certainty to a pedestrian or non-pedestrian mode. In such case wherein the certainty is greater than a threshold, the probe trace dataset may classified as clear pedestrian or non-pedestrian data—as the case may be. In another scenario, there may be particular parameters and/or methodologies to fit a series of probe traces into a category based on simple features. For example, these may include clear pedestrian/non-pedestrian areas (i.e. walking paths, highways, etc.) or probe trace data that clearly exemplifies attributes characteristic of one of the categories. In one embodiment, the clear probe trace data is classified and separated from non-classifiable ambiguous data. In one scenario, as more clear probe data is analyzed and catalogued, the ambiguous data may be reassessed to determine if these probe trace datasets may fit a classifiable model as such becomes more updated and refined.

In one embodiment, the system 100 may categorize the probe trace data in a clearly pedestrian or non-pedestrian category based on information as to a specific location and/or path characteristics of the data. In one scenario, the system 100 may identify a set of probe trace data as pedestrian, when the data originates from one or more pedestrian zones, a probe trace is headed in a wrong direction on a one-way street, originates from a street that is closed to non-pedestrian traffic, and/or other like categories. Likewise, in another scenario, the system 100 may identify a set of probe trace data as non-pedestrian, when the probe trace data indicates traveling at a non-pedestrian speed, originates from one or more fleets of probe traces, originates from a street with no pedestrian paths, and/or other like categories. Therefore, the system may classify some of the probe traces based on simple criteria. Other probe traces may be left uncategorized (ambiguous), but may be classified as more refined and detailed methods are employed, such as those using a statistical model for analysis and categorization.

Returning to FIG. 1, in one embodiment, the user interface platform 109 may create content repository 111 wherein probe trace data is catalogued using statistical methods through a machine learning protocol. In another embodiment, the user interface platform 109 may receive content information from various sources, for example, the sensors 105, third-party content providers, databases, etc. and may store the received information on the content repository 111. The content repository 111 may include identifiers to the UE 101 as well as associated information. Further, the information may be any multiple types of information that can provide means for aiding in the content provisioning process. In a further embodiment, the content repository 111 assists by providing information on relevant attributes of statistically modeled probe trace data to distinguish travel modes.

The services platform 113 may include any type of service. By way of example, the services platform 113 may include content (e.g., audio, video, images, etc.) provisioning services, application services, storage services, contextual information determination services, location based services, social networking services, information (e.g., weather, news, etc.) based services, etc. In one embodiment, the services platform 113 may interact with the UE 101, the 3D user interface platform 109 and the content provider 117a-117n (hereinafter content provider 117) to supplement or aid in the processing of the content information.

By way of example, services 115a-115n (hereinafter services 115) may be an online service that reflects interests and/or activities of users. In one scenario, the services 115 provide representations of each user (e.g., a profile), his/her social links, and a variety of additional information. The services 115 allow users to share media information, location information, activities information, contextual information, and interests within their individual networks, and provides for data portability.

The content provider 117 may provide content to the UE 101, the user interface platform 109, and the services 115 of the services platform 113. The content provided may be any type of content, such as image content, video content, audio content, textual content, etc. In one embodiment, the content provider 117 may provide content that may supplement content of the applications 103, the sensors 105, the content repository 111 or a combination thereof. By way of example, the content provider 117 may provide content that may aid in causing a generation of at least one request to capture at least one content presentation. In one embodiment, the content provider 117 may also store content associated with the UE 101, the user interface platform 109, and the services 115 of the services platform 113. In another embodiment, the content provider 117 may manage access to a central repository of data, and offer a consistent, standard interface to data, such as a repository of users' navigational data content.

Figure 2:
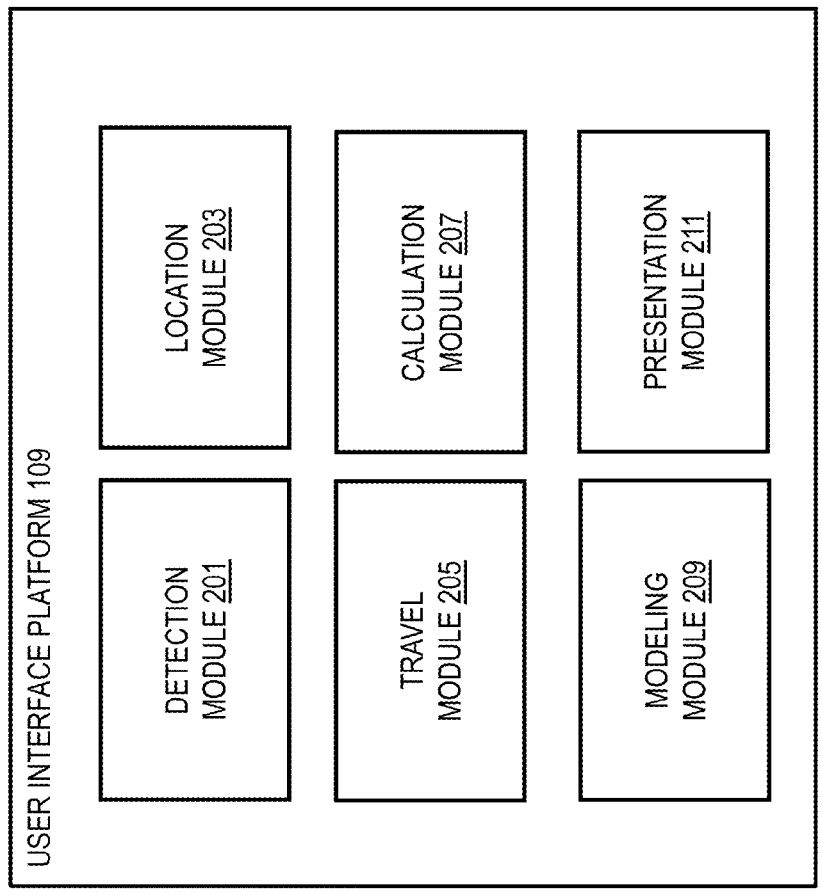
FIG. 2 is a diagram of the components of a user interface platform 109 for the processing of probe trace data to determine one or more modes of transport, and causing a classification of the probe trace data, according to one embodiment.

FIG. 2 is a diagram of the components of a user interface platform 109, according to one embodiment. By way of example, the user interface platform 109 includes one or more components causing a processing of probe trace data to determine one or more modes of transport and causing a classification of the modes based on mode indicators. It is contemplated that the functions of these components may be combined in one or more components or performed by other components of equivalent functionality. In one embodiment, the user interface platform 109 includes a detection module 201, a location module 203, a travel module 205, a calculation module 207, a modeling module 209, and a presentation module 211.

In one embodiment, the detection module 201 includes system algorithms, sensors 111, and network databases 121 for a processing of probe trace data to detect one or more modes of transport to cause a classification of the modes based on mode indicators. The mapping and/or detection data can be preprogrammed into the user interface platform 109, gathered from crowd source data network, or gathered from at least one sensor or device, and processed via the location module 203 and travel module 205 to provide a mapping of probe trace data to determine one or more modes of transport which may in turn cause a classification of the modes based on mode indicators. This detection module 201 may be further modified with user preferences and tolerances, which, in part, provide a mapping of transportation modes based on pedestrian or non-pedestrian probe trace data.

In one embodiment, the location module 203 includes an integrated system for a processing of mapping and probe trace data location information to determine one or more modes of transport and causing a classification of the modes based on location information and related indicators. Such location information can be stored in an on-board systems database, modified manually, accessed when prompted by an application 103, or gathered from devices or sensors incorporated into the detection module 201 and processed via the location module 203 to provide mapping location information. The location module 203 may also be used to correlate mapping information with probe trace data. This location information may be further modified with user preferences and tolerances, which, in part, provide selective modifications of the location determination system.

In multiple embodiments, the travel module 205 provides transportation mode information and in part characterizes probe trace attributes. This transportation mode information provides personal transportation information including mode characteristics and preferences and also integrates public transport mode characteristics for an integrated module that may include evaluation algorithms for determining multiple modes of transport—pedestrian or non-pedestrian. The travel module can be integrated to include data from multiple sources including: mapping data, crowd source data, data from networks or databases, weather reports, and real-time information from sensors/detectors via the detection module 201 that is integrated with the processes of the travel module 205. Furthermore, this integration can provide a calculation for the travel characteristics and mode information including those as related to mapping information processed via the location module 203.

In multiple embodiments, the calculation module 207 will process the outputted information of the location module 203 and travel module 205, respectively. The location module 203 and travel module 205 configure the mapping information and the probe trace data. Therefore, the user interface platform 109 includes a calculation module 207 to evaluate the location module 203 and travel module 205 and integrate the two using inputted data, algorithms, and process formats to calculate relevant probe trace information and determine discrepancies and errors for the mapping of probe trace information. This integrated mapping data may be outputted to the modeling module 209 to provide the appropriate analysis of statistical patterns for probe trace datasets that require more extensive statistical analysis for categorization for a pedestrian or non-pedestrian mode of transport.

In multiple embodiments, the modeling module 209 causes an analysis of the probe trace data and location information based, in part, on the calculation module 207, which evaluates the location module 203 and travel module 205, respectively. This module 209 may make a determination of modes (pedestrian, non-pedestrian) based on a statistical analysis of the probe trace data and a probability calculation that the attributes of one or more probe traces correspond to a particular mode of transport. Some of the calculations may be delegated to the calculation model, while the modeling and statistical software perform a variety of analyses. Numerous inputs may be applicable including probability thresholds, software requirements, network data, sensor inputs, personal preferences, real-time data and other like inputs. Furthermore, the modeling module 209 can incorporate feedback information from other modules through multiple iterations. The mode information can be mapped to present the travel modes using a topographic presentation of particular travel mode areas. Such information may be presented and interfaced to the at least one occupant via the presentation module 211.

Figure 3:
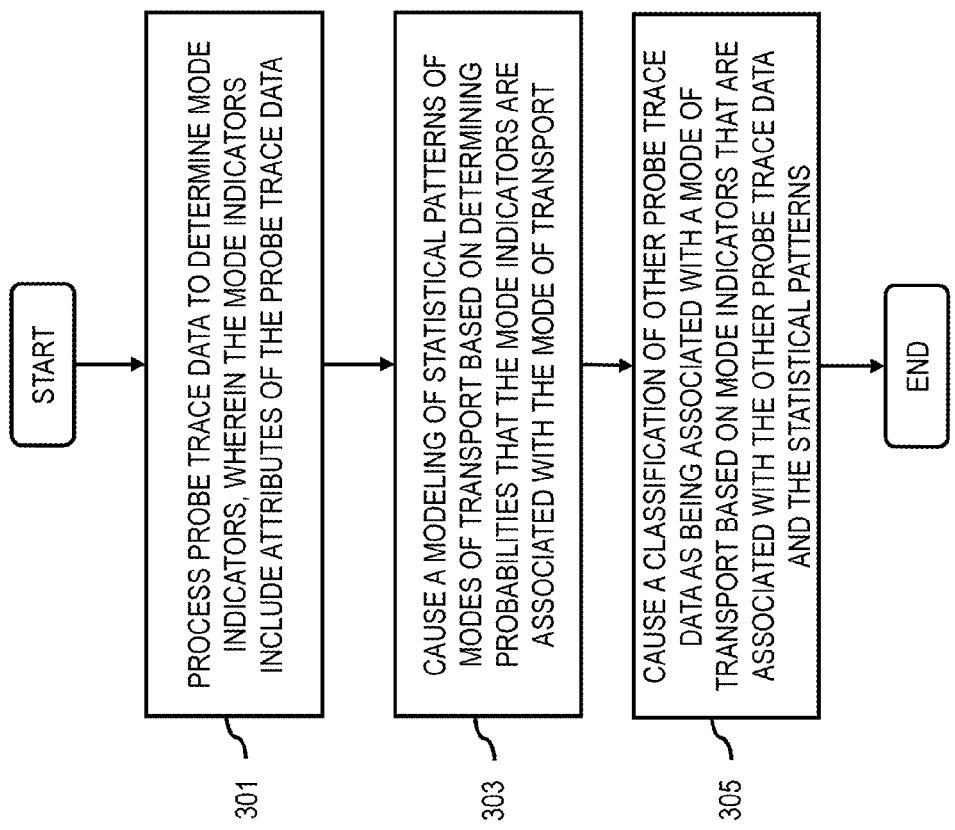
FIG. 3 is a flowchart of a process for the processing of probe trace data to determine one or more modes of transport, and causing a classification of the probe trace data, according to one embodiment.
Figure 10:
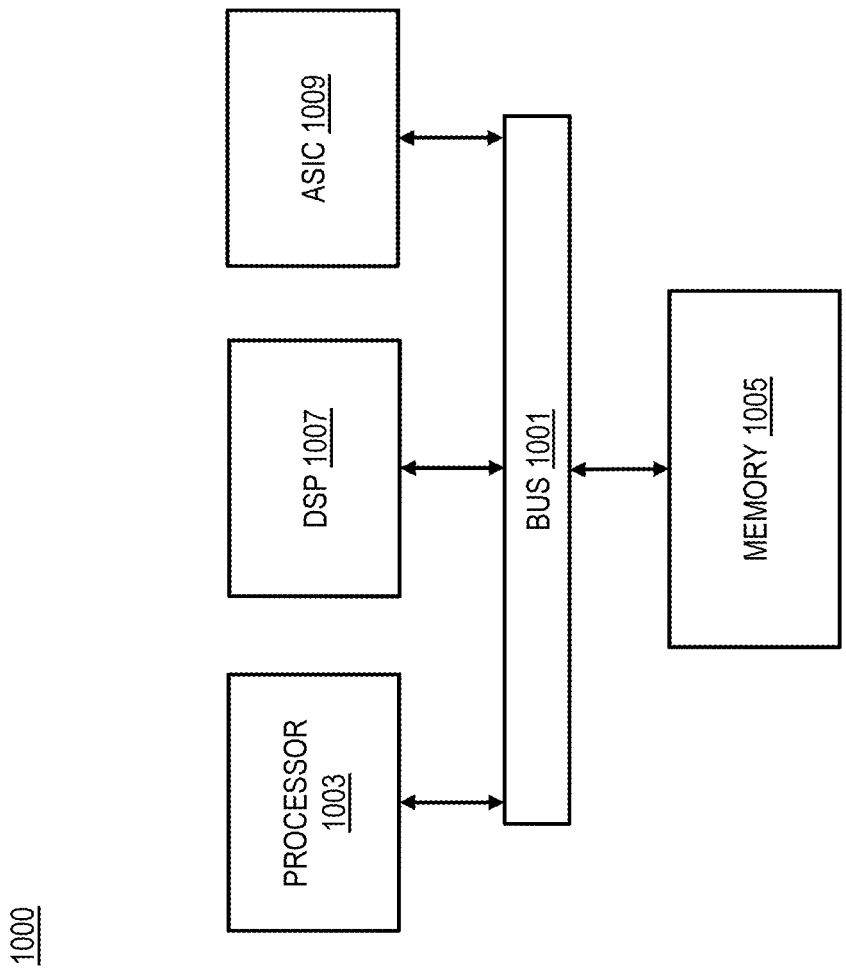
FIG. 10 is a diagram of a chip set that can be used to implement an embodiment of the invention.

FIG. 3 is a flowchart of a process for the processing of probe trace data to determine one or more modes of transport, and causing a classification of the probe trace data, according to one embodiment. In one embodiment, the user interface platform 109 performs the process 300 and is implemented in, for instance, a chip set including a processor and a memory as shown in FIG. 10.

In step 301, the user interface platform 109 may process and/or facilitate a processing of probe trace data to determine one or more mode indicators. In one embodiment, the one or more mode indicators include, at least in part, one or more attributes of the probe trace data. In another embodiment, the one or more mode indicators include, at least in part, speed information, speed change rate information, heading information, heading change rate information, stop rate information, information regarding closeness to one or more road links, or a combination thereof. In one embodiment, the probe trace data includes, at least in part, clear pedestrian probe trace data, clear non-pedestrian probe trace data, ambiguous probe trace data, or a combination thereof. In another embodiment, the probe trace data includes a sequence of a plurality of location data points, and wherein the plurality of location data points indicate, at least in part, that a probe is at a location with a speed and a heading at a time. In one scenario, the user interface platform 109 may include a process of modeling, using algorithms and other like means, to process attributes of the probe trace data in order to recognize one or more characteristic patterns. In one example embodiment, the user interface platform 109 may cause a modeling of one or more statistical patterns for various modes of transport (pedestrian mode, vehicle mode, etc.). Then, the user interface platform 109 may determine a probability that one or more mode indicators are associated with at least one mode of transport.

In step 303, the user interface platform 109 may cause, at least in part, a modeling of one or more statistical patterns of at least one pedestrian mode of transport, at least one non-pedestrian mode of transport, or a combination thereof based, at least in part, on determining one or more probabilities that one or more mode indicators are associated with the at least one pedestrian mode of transport, the at least one non-pedestrian mode of transport, or a combination thereof. In one embodiment, the modeling of the one or more statistical patterns for the at least one pedestrian mode of transport is trained based, at least in part, on the clear pedestrian probe trace data. In another embodiment, the modeling of the one or more statistical patterns for the at least one non-pedestrian mode of transport is trained based, at least in part, on the clear non-pedestrian probe data. In a further embodiment, the other probe data includes, at least in part, the ambiguous probe trace data. In one scenario, the acquired statistical patterns may, in turn, be used to determine one or more modes of transport (pedestrian, non-pedestrian, etc.). In another scenario, after the user interface platform 109 has performed an initial classification by analyzing the one or more attributes, the more ambiguous data may be subsequently classified based on further analysis of these statistical patterns. The acquired pattern analysis can be applied to current and future data by matching the analyzed attributes to the relevant modes of transport. In one embodiment, the user interface platform 109 may determine one or more probabilities that one or more mode indicators are associated with the at least one pedestrian mode of transport, the at least one non-pedestrian mode of transport, or a combination thereof. In one scenario, the attributes, alone or in combination, are correlated with a mode of transport. Such attributes may include speed information, speed change rate information, heading information, heading change rate information, stop rate information, information regarding closeness to one or more road links, and/or other like parameters. The correlation between such attributes and a mode of transport may be given a probability or other like factor, and include other statistical features including such parameter as variance, distribution, standard deviation and the like to determine the relative certainty of one or more probe data traces. Furthermore, the probabilities may be adjusted based on the user's need and/or feedback information as to the reliability of each data set.

In step 305, the user interface platform 109 may cause a classification of other probe trace data as being associated with the at least one pedestrian mode of transport or the at least one non-pedestrian mode of transport based, at least in part, on the one or more mode indicators that are associated with the other probe trace data and the one or more statistical patterns. In one embodiment, the mode indicators are associated with other probe trace data and the one or more statistical patterns. In this scenario, the probe trace data may not fit classification as definitively pedestrian or non-pedestrian. In other words, the attributes are ambiguous and does not clearly associate with one or more modes of transport. However, through an iterative process of correlating attributes with a transportation mode and understanding the relationship between different attributes and modes of transport, some or all of this ambiguous data may be classified under a pedestrian or non-pedestrian mode of transport.

Figure 4:
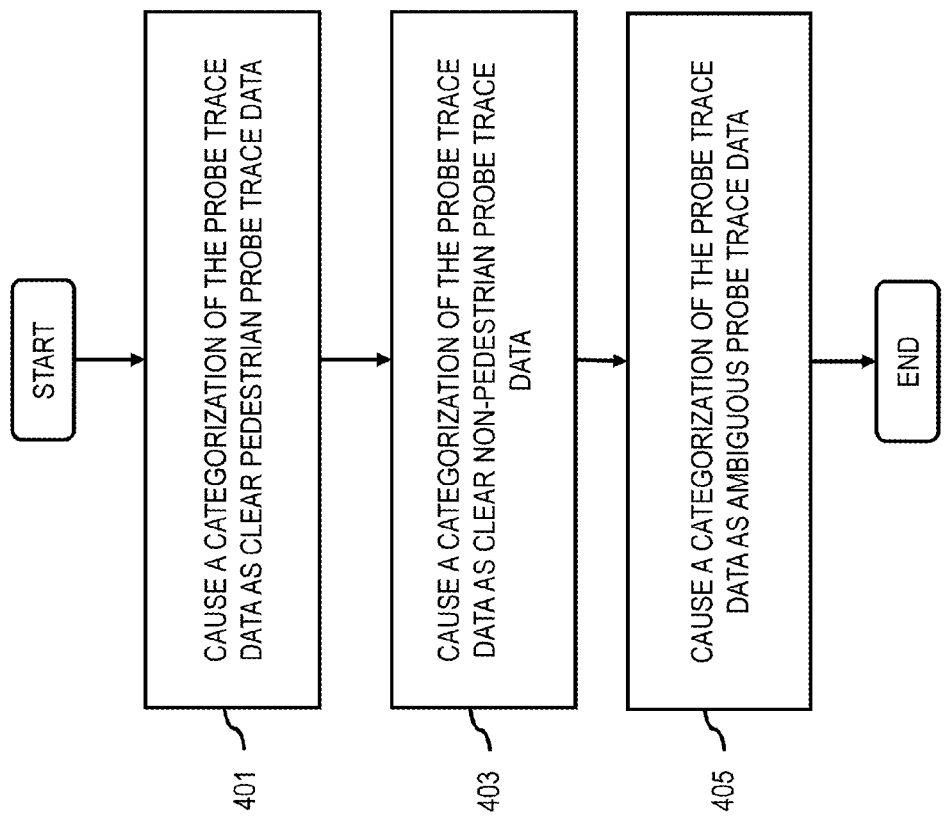
FIG. 4 is a flowchart of a process for causing a categorization of the probe trace data as pedestrian probe trace data, non-pedestrian probe trace data, or ambiguous probe trace data, according to one embodiment.

FIG. 4 is a flowchart of a process for causing a categorization of the probe trace data as pedestrian probe trace data, non-pedestrian probe trace data, or ambiguous probe trace data, according to one embodiment. In one embodiment, the user interface platform 109 performs the process 400 and is implemented in, for instance, a chip set including a processor and a memory as shown in FIG. 10.

In step 401, the user interface platform 109 may cause a categorization of the probe trace data as the clear pedestrian probe trace data based, at least in part, on a speed of travel, a location in a spatial domain, a smartphone reporting activity, one or more path characteristics, or a combination thereof. In one scenario, the modeling of the one or more statistical patterns for the at least one pedestrian mode of transport is based, at least in part, on the clear pedestrian probe trace data. In another scenario, the statistical patterns that clearly fit the criteria for a pedestrian mode data set are segregated and analyzed. In a further scenario, patterns of speed information, velocity, acceleration, deceleration, heading information, heading change rate information, and other like parameters can be catalogued. These attributes may then be used to design a model using statistical processes and algorithms to determine whether the given attributes correspond with relatively high certainty to a pedestrian mode. In such cases, wherein the certainty is greater than a threshold, the probe trace dataset may be classified as clear pedestrian data. In another scenario, there may be particular parameters and/or methodologies to fit a series of probe traces into a category based on simple features. For example, these may include clear pedestrian (i.e. walking paths, sidewalks, closed to traffic, etc.) probe trace data that clearly exemplifies attributes characteristic of the pedestrian category.

In step 403, the user interface platform 109 may cause a categorization of the probe trace data as the clear non-pedestrian probe trace data based, at least in part, on a speed of travel, a location in a spatial domain, a smartphone reporting activity, one or more path characteristics, or a combination thereof. In one scenario, the user interface platform 109 may cause the modeling of the one or more statistical patterns for the at least one non-pedestrian mode of transport based, at least in part, on the clear non-pedestrian probe trace data. In another scenario, statistical patterns that clearly fit the criteria for a non-pedestrian mode data set are segregated and analyzed. In a further scenario, patterns of speed information, velocity, acceleration, deceleration, heading information, heading change rate information, and other like parameters can be catalogued. These attributes may then be used to design a model using statistical processes and algorithms to determine whether the given attributes correspond with relatively high certainty to a non-pedestrian mode. In such cases, wherein the certainty is greater than a threshold, the probe trace dataset may be classified as clear non-pedestrian data. In another scenario, there may be particular parameters and/or methodologies to fit a series of probe traces into a category based on simple features. For example, these may include clear non-pedestrian (i.e. highways, areas closed to pedestrians, etc.) probe trace data that clearly exemplifies attributes characteristic of one of the non-pedestrian category.

In step 405, the user interface platform 109 may cause a categorization of the probe trace data as ambiguous probe trace data based, at least in part, on a speed of travel, a location in a spatial domain, a smartphone reporting activity, one or more path characteristics, or a combination thereof. In one embodiment, the clear probe trace data is classified and separated from non-classifiable ambiguous data. In one scenario, as more clear probe data is analyzed and catalogued, the ambiguous data may be reassessed to determine if these probe trace datasets may fit a classifiable model as such becomes more updated and refined with more iterations. Thus, this may become part of a machine learning protocol for the assessment of modes of transportation.

Figure 5:
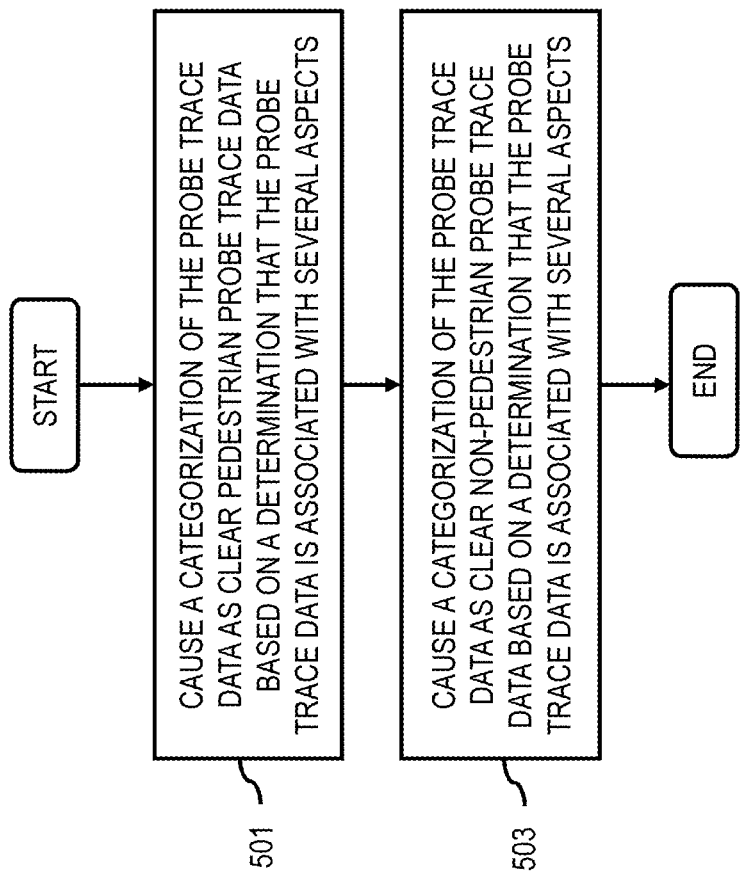
FIG. 5 is a flowchart of a process for cause a categorization of the probe trace data as pedestrian probe trace data, non-pedestrian probe trace data, or ambiguous probe trace data based on characteristics probe attributes, according to one embodiment.

FIG. 5 is a flowchart of a process for cause a categorization of the probe trace data as pedestrian probe trace data, non-pedestrian probe trace data, or ambiguous probe trace data based on characteristics probe attributes, according to one embodiment. In one embodiment, the user interface platform 109 performs the process 500 and is implemented in, for instance, a chip set including a processor and a memory as shown in FIG. 10

In step 501, the user interface platform 109 may categorize the probe trace data in a clearly pedestrian category based on information as to a specific location and/or path characteristics of the data. In one embodiment, the user interface platform may cause a categorization of the probe trace data as the clear pedestrian probe trace data based, at least in part, on a determination that the probe trace data is associated with at least one of several categories. In one scenario, the user interface platform 109 may identify a set of probe trace data as pedestrian, when the data originates from one or more pedestrian zones, a probe trace is headed in a wrong direction on a one-way street, originates from a street that is closed to non-pedestrian traffic, and/or other like categories. Therefore, the user interface platform 109 may classify some of the probe traces based on such straightforward criteria.

In step 503, the user interface platform 109 may categorize the probe trace data in a clearly non-pedestrian category based on information as to a specific location and/or path characteristics of the data. In one embodiment, the user interface platform may cause a categorization of the probe trace data as the clear non-pedestrian probe trace data based, at least in part, on a determination that the probe trace data is associated with at least one of several categories. In one scenario, the user interface platform 109 may identify a set of probe trace data as non-pedestrian, when the probe trace data indicates traveling at a non-pedestrian speed, originates from one or more fleets of probe traces, originates from a street with no pedestrian paths, and/or other like categories. Therefore, the user interface platform 109 may classify some of the probe traces based on such straightforward criteria. Other probe traces may be left uncategorized (ambiguous), but may be later classified as more refined and detailed methods are employed, such as those using a statistical model for analysis and categorization.

Figure 6:
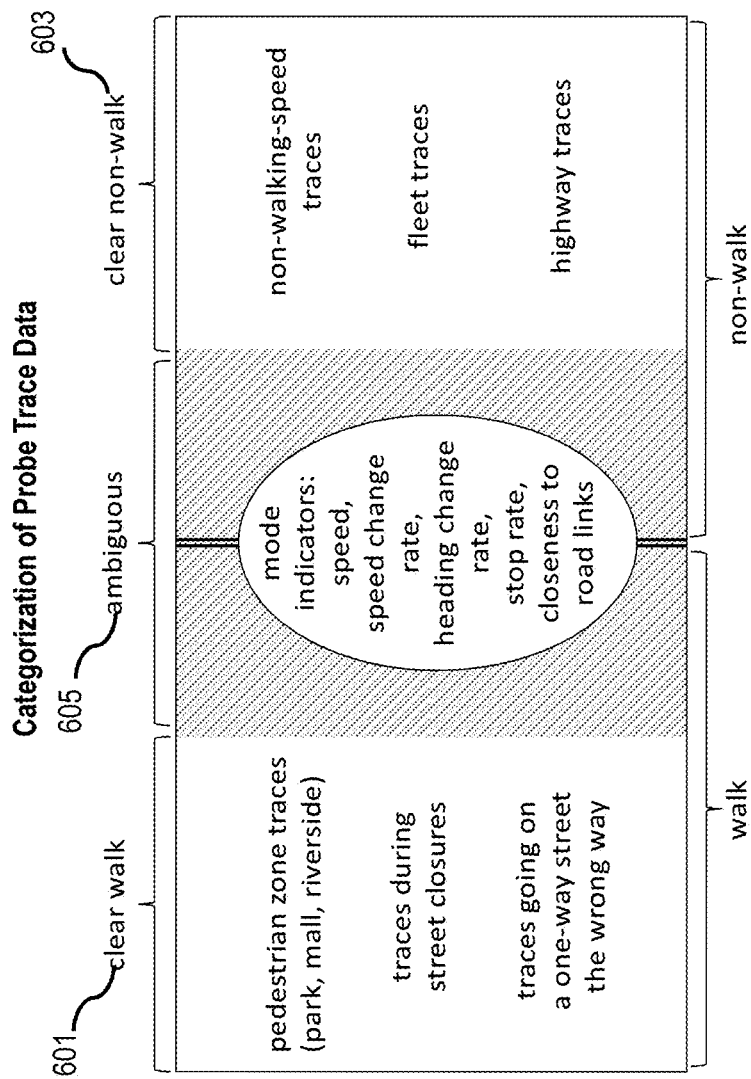
FIG. 6 is a diagram showing the method of processing the probe trace data to determine one or more modes of transport, according to one example embodiment.

FIG. 6 is a diagram showing the method of processing the probe trace data to determine one or more modes of transport, according to one example embodiment. In one scenario, there may be three categories of traces based, at least in part, on the type of data and the level of ambiguity in classification. The first category, shown in the left side column 601, includes traces that can be clearly classified as in walk mode. These include traces in pedestrian zones/streets, traces that are going on a one-way street the wrong way, traces that are generated during the time streets are closed for vehicle traffic, etc. The second type, shown in the right side column 603, includes traces that can be clearly classified as in non-walk mode. These include traces that are moving at speeds significantly higher than walking speeds; traces that are generated by fleets; and traces on roads where there are no sidewalks such as highways, etc. The third type, shown in the middle column 605 are traces for which there can be ambiguity in classification and thus cannot be clearly classified. For example, a trace moving at 4 miles per hour may be a brisk walk or a slowly moving vehicle in a traffic jam. As a result, there is a need to fuse various attributes for a reliable classification of ambiguous traces.

Figure 7:
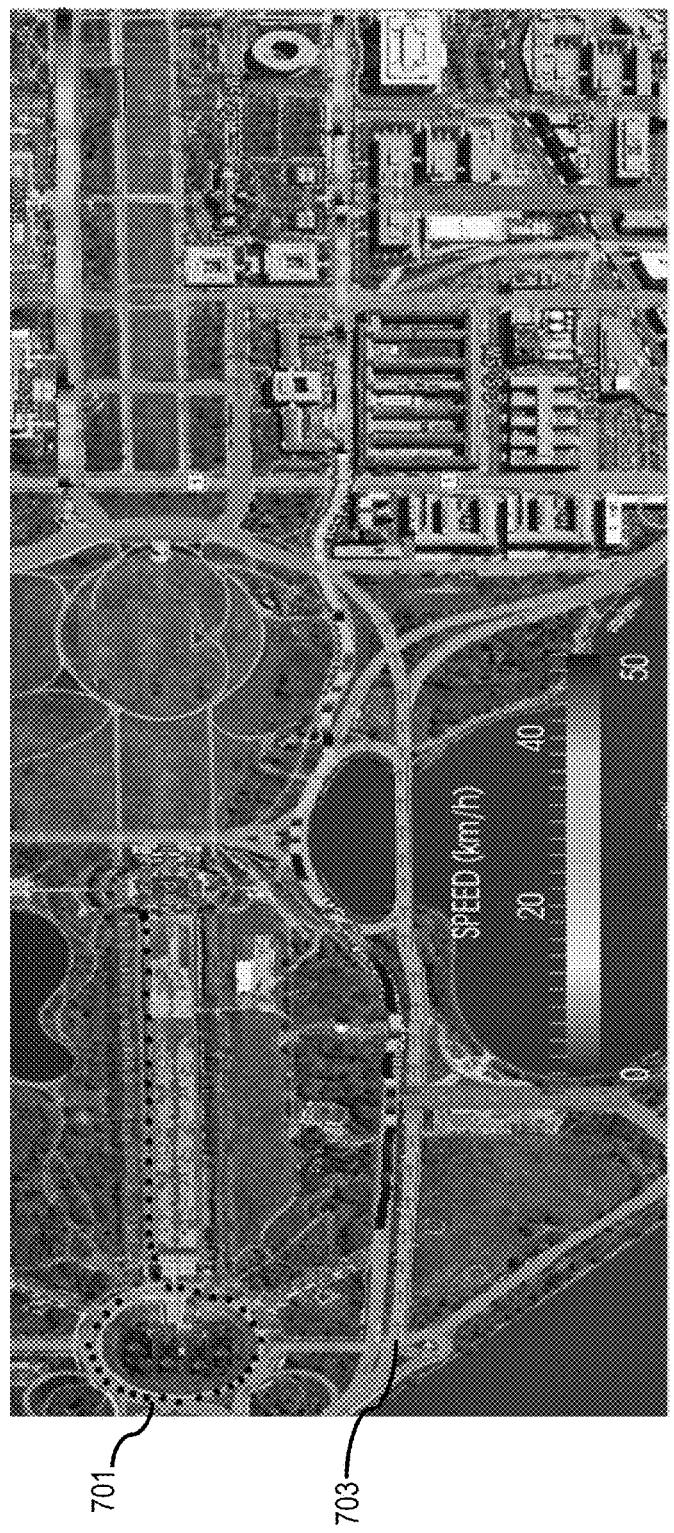
FIG. 7 represents a scenario wherein a user is presented with a mapping of a processing of the probe trace data to determine one or more modes of transport, according to one example embodiment.

FIG. 7 represents a scenario wherein a user is presented with a mapping of a processing of the probe trace data to determine one or more modes of transport, according to one example embodiment. For example, the diagram may show two real life traces 701 and 703 extracted from probe data. The two traces are generated by a pedestrian (i.e., 701) and a vehicle (i.e., 703) respectively, and may be color coded by speed. Likewise, the probe traces may be distinguished with other criteria, such as origin-destination, location, heading change rate, speed change rate, frequency of stops, closeness to road links, and other like criteria.

Figure 8A:
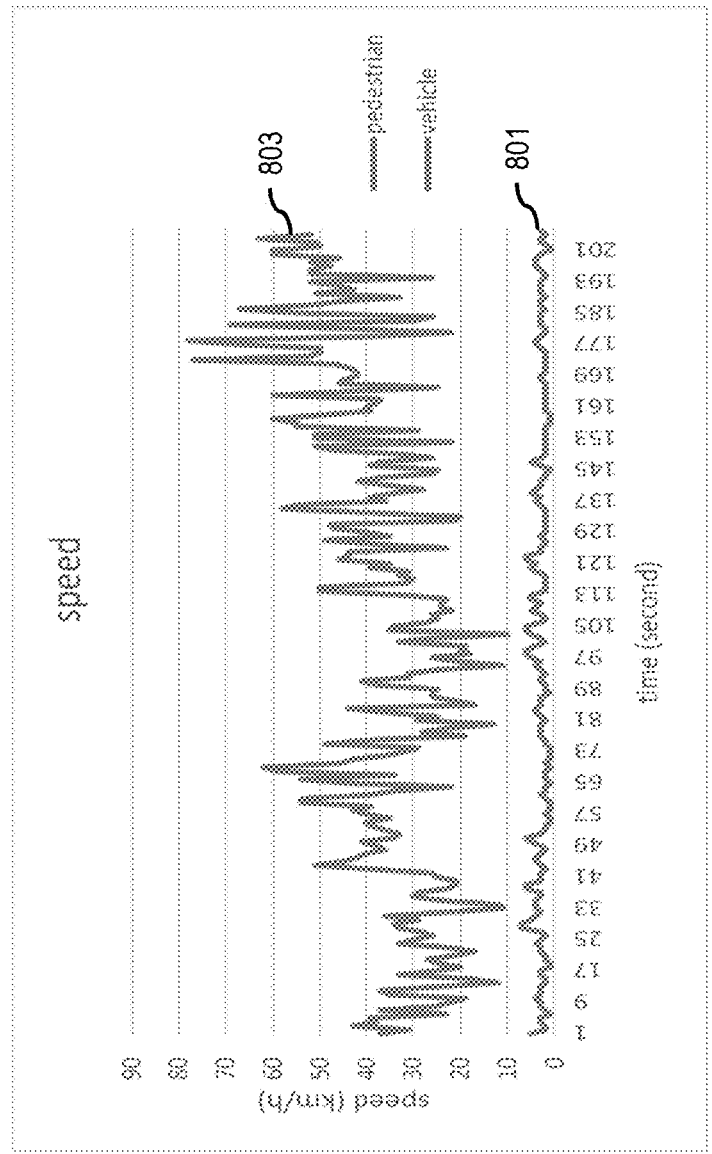
FIGS. 8 A-B are diagrams showing statistical modeling with a corresponding pattern to determine one or more modes of transport, according to one example embodiment.
Figure 8B:
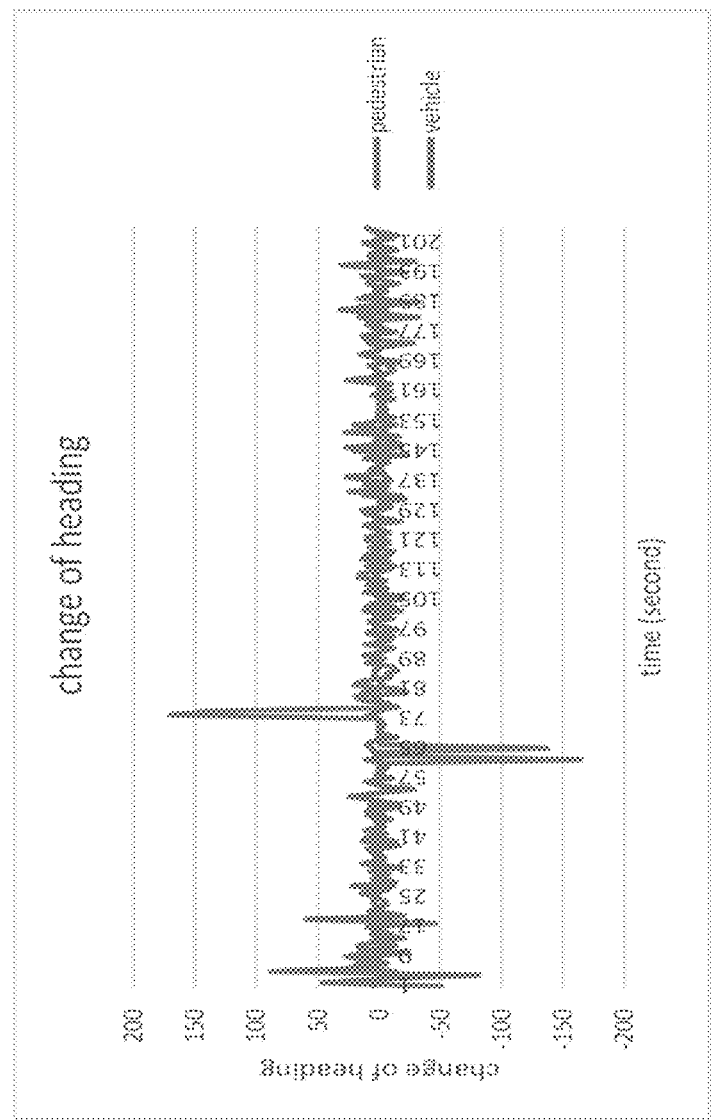

FIGS. 8A-B are diagrams showing statistical modeling with a corresponding pattern to determine one or more modes of transport, according to one example embodiment. These graphs show the speed curves and the heading change curves, respectively, of the two traces. Each point in a heading change curve represents the change of heading from the previous point. In one scenario, FIG. 8A shows that the two trajectories are well distinguished by speed with the flatter and lower curve 801 corresponding to the pedestrian probe trace and the undulating higher curve 803 corresponding to the vehicle (non-pedestrian) probe trace. In another scenario, FIG. 8B shows that the two trajectories may be distinguished by heading change as well. Particularly, the heading change curve for the pedestrian trace has several spikes which are typical for a pedestrian, while the more constant heading rate corresponds to the vehicle (non-pedestrian).

The processes described herein for a processing of probe trace data to determine one or more modes of transport may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
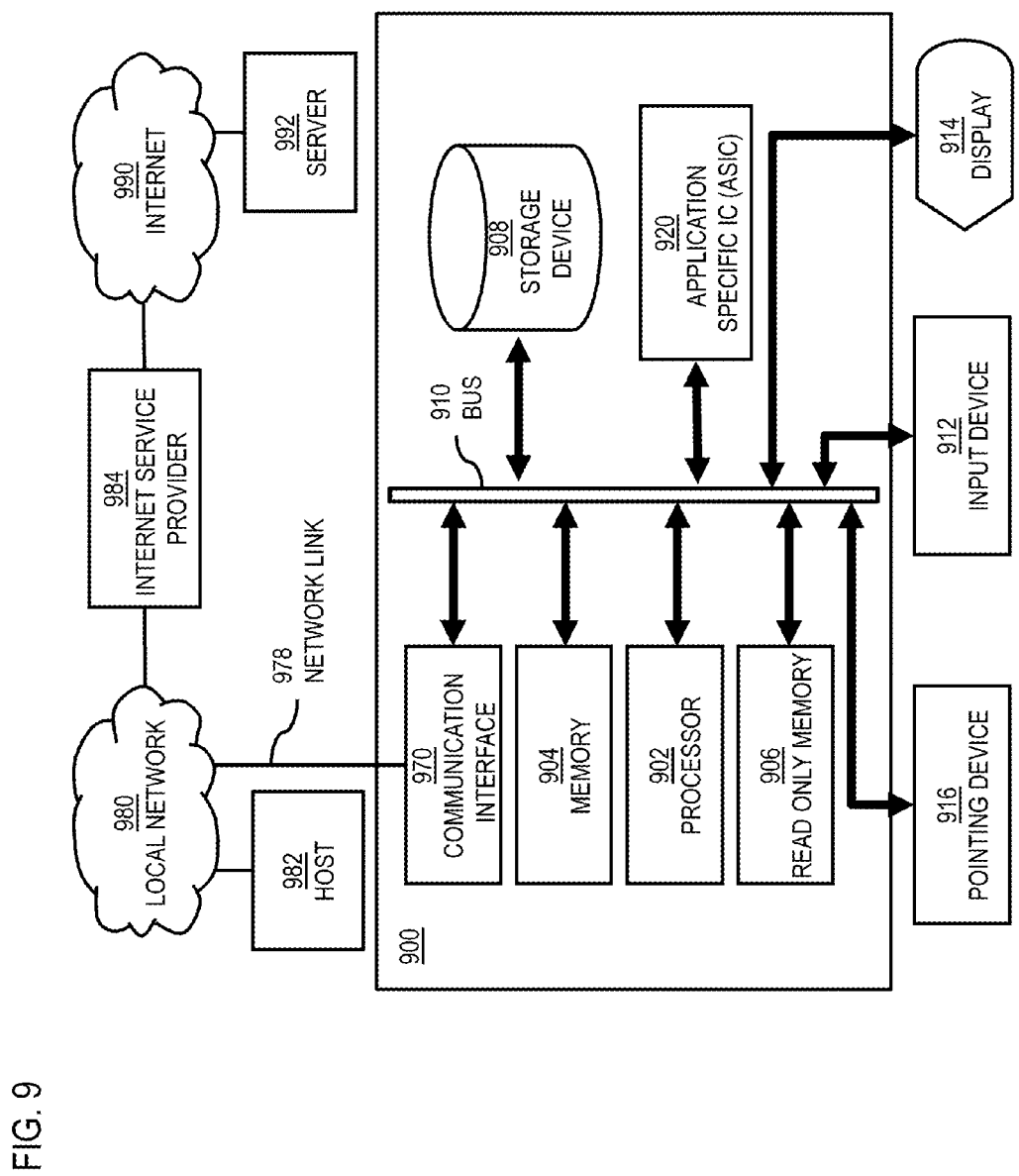
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to process probe trace data to determine one or more modes of transport as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of a processing of probe trace data to determine one or more modes of transport.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to a processing of probe trace data to determine one or more modes of transport. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for a processing of probe trace data to determine one or more modes of transport. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for a processing of probe trace data to determine one or more modes of transport, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for a processing of probe trace data to determine one or more modes of transport to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to process probe trace data to determine one or more modes of transport as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of a processing of probe trace data to determine one or more modes of transport.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to process probe trace data to determine one or more modes of transport. The memory 1005 also stores the data associated with or generated by the execution of the inventive steps.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of a processing of probe trace data to determine one or more modes of transport. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of a processing of probe trace data to determine one or more modes of transport. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to process probe trace data to determine one or more modes of transport. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. The methods and systems (including steps and components thereof) can be mixed, matched, and/or rearranged. Additionally more, fewer, or different method steps or device/system components may be provided with less, more or different steps.

What is claimed is:

1. A method for developing an enhanced certainty in detecting a mode associated with probe data, the method comprising:
   receiving, utilizing at least one interface, probe trace data associated with one or more physical probe sensors;
   processing, utilizing at least one processor controlling a memory, probe trace data by one or more physical probe sensors which follow a travel path of a mode of transport to determine one or more mode indicators, wherein the one or more mode indicators include, at least in part, one or more attributes of the probe trace data;
   modeling one or more statistical patterns of at least one pedestrian mode of transport, at least one non-pedestrian mode of transport, or a combination thereof based, at least in part, on determining one or more probabilities that the determined one or more mode indicators are associated with the at least one pedestrian mode of transport, the at least one non-pedestrian mode of transport, or a combination thereof;
   categorizing the probe trace data as clear pedestrian probe trace data, clear non-pedestrian probe trace data or ambiguous probe trace data based, at least in part, on the modeled one or more statistical patterns;
   classifying at least some part of the categorized probe trace data as being associated with the at least one pedestrian mode of transport or the at least one non-pedestrian mode of transport based, at least in part, on the one or more mode indicators that are associated with the other probe trace data and the modeled one or more statistical patterns,
   wherein the categorized probe trace data includes clear pedestrian probe trace data, clear non-pedestrian probe trace data, and ambiguous probe trace data,
   wherein the modeling of the one or more statistical patterns is configured to increase certainty of the classified mode of transportation; and
   transmitting, utilizing the at least one interface, at least some part of the association of the classified categorized probe trace data with the at least one pedestrian mode of transport or the at least one non-pedestrian mode of transport for developing the solution associated with transportation and/or geography.

2. A method of claim 1, wherein the one or more mode indicators include, at least in part, speed information, speed change rate information, heading information, heading change rate information, stop rate information, information regarding closeness to one or more road links, or a combination thereof.

3. A method of claim 1, wherein the modeling of the one or more statistical patterns for the at least one pedestrian mode of transport is trained based, at least in part, on the clear pedestrian probe trace data.

4. A method of claim 1, wherein the modeling of the one or more statistical patterns for the at least one non-pedestrian mode of transport is trained based, at least in part, on the clear non-pedestrian probe data.

5. A method of claim 1, wherein the other probe data includes, at least in part, the ambiguous probe trace data.

6. A method of claim 1, further comprising:
   categorizing the probe trace data as the clear pedestrian probe trace data, the clear non-pedestrian probe trace data, or the ambiguous probe trace data based, at least in part, on a speed of travel, a location in a spatial domain, a smartphone reporting activity, one or more path characteristics, or a combination thereof.

7. A method of claim 1, further comprising:
   categorizing the probe trace data as the clear pedestrian probe trace data based, at least in part, on a determination that the probe trace data is associated with at least one of:
   originating from one or more pedestrian zones;
   traveling a wrong direction on a one-way street; and
   originating from a street that is closed to non-pedestrian traffic.

8. A method of claim 1, further comprising:
   categorizing the probe trace data as the clear non-pedestrian probe trace data based, at least in part, on a determination that the probe trace data is associated with at least one of:
   traveling at a non-pedestrian speed;
   originating from one or more fleets; and
   originating from a street with no pedestrian paths.

9. A method of claim 1, wherein the probe trace data includes a sequence of a plurality of location data points, and wherein the plurality of location data points indicate, at least in part, that a probe is at a location with a speed and a heading at a time.

10. An apparatus for developing an enhanced certainty in detecting a mode associated with probe data, the apparatus comprising:
    at least one processor; and
    at least one memory including computer program code for one or more programs, the at least one memory and the computer program code configured to, with the at least one processor controlling the memory, cause the apparatus to perform at least the following:
- receiving, utilizing at least one interface, probe trace data associated with one or more physical probe sensors;
- processing probe trace data by one or more physical probe sensors which follow a travel path of a mode of transport to determine one or more mode indicators,
  - wherein the one or more mode indicators include, at least in part, one or more attributes of the probe trace data;
- modeling one or more statistical patterns of at least one pedestrian mode of transport, at least one non-pedestrian mode of transport, or a combination thereof based, at least in part, on determining one or more probabilities that the determined one or more mode indicators are associated with the at least one pedestrian mode of transport, the at least one non-pedestrian mode of transport, or a combination thereof;
- categorizing the probe trace data as clear pedestrian probe trace data, clear non-pedestrian probe trace data or ambiguous probe trace data based, at least in part, on the modeled one or more statistical patterns;
- classifying at least some part of the categorized probe trace data as being associated with the at least one pedestrian mode of transport or the at least one non-pedestrian mode of transport based, at least in part, on the one or more mode indicators that are associated with the other probe trace data and the modeled one or more statistical patterns,
  - wherein the categorized probe trace data includes clear pedestrian probe trace data, clear non-pedestrian probe trace data, and ambiguous probe trace data,
  - wherein the modeling of the one or more statistical patterns is configured to increase certainty of the classified mode of transportation; and
- transmitting, utilizing the at least one interface, at least some part of the association of the classified categorized probe trace data with the at least one pedestrian mode of transport or the at least one non-pedestrian mode of transport for developing the solution associated with transportation and/or geography.

11. An apparatus of claim 10, wherein the one or more mode indicators include, at least in part, speed information, speed change rate information, heading information, heading change rate information, stop rate information, information regarding closeness to one or more road links, or a combination thereof.

12. An apparatus of claim 10, wherein the modeling of the one or more statistical patterns for the at least one pedestrian mode of transport is trained based, at least in part, on the clear pedestrian probe trace data.

13. An apparatus of claim 10, wherein the modeling of the one or more statistical patterns for the at least one non-pedestrian mode of transport is trained based, at least in part, on the clear non-pedestrian probe data.

14. An apparatus of claim 10, wherein the other probe data includes, at least in part, the ambiguous probe trace data.

15. An apparatus of claim 10, wherein the apparatus is further caused to:
- categorize the probe trace data as the clear pedestrian probe trace data, the clear non-pedestrian probe trace data, or the ambiguous probe trace data based, at least in part, on a speed of travel, a location in a spatial domain, a smartphone reporting activity, one or more path characteristics, or a combination thereof.

16. A non-transitory computer-readable storage medium carrying one or more sequences of one or more instructions which, when executed by one or more processors controlling a memory, cause an apparatus to at least perform the following steps for developing an enhanced certainty in detecting a mode associated with probe data:
- receiving, utilizing at least one interface, probe trace data associated with one or more physical probe sensors;
- processing the probe trace data by one or more physical probe sensors which follow a travel path of a mode of transport to determine one or more mode indicators,
  - wherein the one or more mode indicators include, at least in part, one or more attributes of the probe trace data;
- modeling one or more statistical patterns of at least one pedestrian mode of transport, at least one non-pedestrian mode of transport, or a combination thereof based, at least in part, on determining one or more probabilities that the determined one or more mode indicators are associated with the at least one pedestrian mode of transport, the at least one non-pedestrian mode of transport, or a combination thereof;
- categorizing the probe trace data as clear pedestrian probe trace data, clear non-pedestrian probe trace data or ambiguous probe trace data based, at least in part, on the modeled one or more statistical patterns;
- classifying at least some part of the categorized probe trace data as being associated with the at least one pedestrian mode of transport or the at least one non-pedestrian mode of transport based, at least in part, on the one or more mode indicators that are associated with the other probe trace data and the modeled one or more statistical patterns,
  - wherein the categorized probe trace data includes clear pedestrian probe trace data, clear non-pedestrian probe trace data, and ambiguous probe trace data,
  - wherein the modeling of the one or more statistical patterns is configured to increase certainty of the classified mode of transportation; and
- transmitting, utilizing the at least one interface, at least some part of the association of the classified categorized probe trace data with the at least one pedestrian mode of transport or the at least one non-pedestrian mode of transport for developing the solution associated with transportation and/or geography.

17. A computer-readable storage medium of claim 16, wherein the one or more mode indicators include, at least in part, speed information, speed change rate information, heading information, heading change rate information, stop rate information, information regarding closeness to one or more road links, or a combination thereof.

* * * * *